United States Patent [19]

Gershon et al.

[11] Patent Number: 5,427,683
[45] Date of Patent: Jun. 27, 1995

[54] FILTRATION SYSTEM WITH AXIAL FLOW CARTRIDGE

[75] Inventors: Norman B. Gershon, En Chatel, Switzerland; David J. Truluck, Wisbech, England

[73] Assignee: Oil-Dri Corporation of America, Chicago, Ill.

[21] Appl. No.: 183,144

[22] Filed: Jan. 18, 1994

Related U.S. Application Data

[62] Division of Ser. No. 850,659, Mar. 12, 1992, Pat. No. 5,296,137.

[51] Int. Cl.$^6$ ............................................ B01D 24/08
[52] U.S. Cl. ........................ 210/264; 210/266; 210/282; 210/283; 210/502.1; 210/503
[58] Field of Search ............... 210/263, 264, 266, 282, 210/283, 499, 503, 502.1

[56] References Cited

U.S. PATENT DOCUMENTS

| | | |
|---|---|---|
| 2,300,014 | 10/1942 | Saussure ............... 210/266 |
| 2,454,124 | 11/1948 | Birsch et al. . |
| 2,773,601 | 12/1956 | Keller et al. ............ 210/266 |
| 3,327,859 | 6/1967 | Pall ...................... 210/266 |
| 3,733,267 | 5/1973 | Haase . |
| 4,054,515 | 10/1977 | Sawyer, Jr. . |
| 4,138,337 | 2/1979 | Smith . |
| 4,478,714 | 10/1984 | Blake et al. . |
| 4,765,908 | 8/1988 | Monick et al. . |
| 4,828,698 | 5/1989 | Jewell et al. ........... 210/266 |
| 5,066,391 | 11/1991 | Faria . |
| 5,093,006 | 3/1992 | Kalnins . |
| 5,271,837 | 12/1993 | Discepolo et al. ...... 210/283 |

Primary Examiner—Robert A. Dawson
Assistant Examiner—David Reifsnyder
Attorney, Agent, or Firm—Olson & Hierl, Ltd.

[57] ABSTRACT

An axial flow filtration cartridge, a system, a support assembly, an apparatus, as well as a process are provided for removing particulate matter as well as dissolved heavy metal ions and the like from an aqueous effluent stream. The invention is useful for removing contaminants from industrial waste streams. The cartridge contains features which make it relatively resistant to fouling by solid particles. Additionally, the cartridge has no central void volume. No separate housing for the cartridges is required. In a system embodiment the cartridge has a filtering chamber containing absorbent clay particles confined between porous liquid-permeable retainer. An upstream cartridge cap and a downstream cartridge cap removably receive the ends of the filter cartridge in a liquid-tight seal. The flow of aqueous effluent to each of the cartridges is individually controlled.

15 Claims, 5 Drawing Sheets

FILTRATION SYSTEM WITH AXIAL FLOW CARTRIDGE

This application is a divisional of patent application Ser. No. 07/850,659 filed Mar. 12, 1992 now U.S. Pat. No. 5,296,137.

FIELD OF THE INVENTION

The invention relates to the separation of contaminants from an aqueous effluent stream. More specifically, this invention is directed to adsorption and absorption of contaminants from an aqueous stream upon an adsorbent filter clay. Representative contaminants that can be removed in this manner are heavy metal ions, hormones, toxins, viral microorganisms, and pesticides.

BACKGROUND OF THE INVENTION

Adsorbent clays are widely used to remove color and odor from vegetable and mineral oils. Two different methods elf presenting the clays are utilized: contact filtration and percolation. In the contact filtration method, a finely divided adsorbent is mixed with the solution to be treated, agitlated, and removed from the treated solution by settling and filtration. For percolation, the adsorbent is held in place and the liquid stream to be treated is made to flow over, around, and through it. In the percolation method, the adsorbent usually is in granular form and must have certain mechanical and physical requLrements in order to hold its shape and be retained in place.

Adsorbent clays are also used to purify water. The contact filtration method of applying adsorbent clay to water selectively precipitates some contaminants in the form of sludges which are subsequently disposed of in landfills. For example, U.S. Pat. No. 4,765,908 to Monick et al. describes a process for removing contaminants from a wastewater system by precipitating them as a non-leachable sludge. The process utilizes a precipitation-inducing composition containing bentonite clay which is said to remove contaminants such as phosphates, nitrites, nitrates, and heavy metals from wastewater.

The process of the '908 patent, and contact filtration processes in general, have drawbacks for treating aqueous effluent in that they contact clay and wastewater in a relatively unconfined manner in an open tank. The resulting sludge must be collected before it can be disposed of. Also before disposal, the sludge must be dewatered using a belt filter, wringer, press roller, or the like. Plant personnel necessarily risk exposure to the contaminants during the collection, dewatering, and disposal operations.

Some specially selected and prepared adsorbent clays are capable of holding their shape while in contact with water and are, therefore, suitable for use with the percolation method. U.S. Pat. No. 4,054,515 to Sawyer, Jr. reports that percolation through a column of 30 to 60 mesh low volatile material (LVM) attapulgite clay particles can remove a toxin, a pesticide, a hormone, and heavy metal ions from various aqueous solutions. The '515 patent goes on to suggest that the clay particles be placed in a downflow metal or plastic container with a filter at the bottom to prevent the clay particles from passing out of the container during operation. The patent states further that other adsorbing materials, such as charcoal and sand, can be placed in the container with the clay particles.

However, there is room for further improvement in the application of adsorbent clays to wastewater processing. The simple particulate beds described in the '515 patent are not suitable for use with aqueous effluent streams that contain suspended solids. For example, the '515 patent provides no means to keep the suspended solids from reaching the particulate bed, teaches no means for immobilizing the suspended solids within the bed, and makes no provision for redistributing liquid flow patterns which have been altered or disturbed by agglomerations of the suspended solids. In addition, the particulate beds of the '515 patent are not adapted for use with relatively large volume, industrial scale waste streams.

U.S. Pat. No. 3,733,267 to Haase refers to a cross flow filter cartridge that incorporates a primary filter surrounding an adsorber unit which contains heat-treated attapulgite clay particles of about 6 to 25 mesh size. The cross flow filter cartridge uses concentric, perforated cylinders to contain the clay particles. An external postfilter is sometimes located downstream of the cartridge. The cartridge is said to remove dissolved foreign materials such as fatty acids, colors, and water from streams that may contain small particles, such as dry cleaning fluid or engine oil. The clay particles may be mixed with particles of adsorbent carbon.

Cross flow cartridges, also called radial flow cartridges, lack the simplicity and flexibility required for industrial wastewater treating. Cross flow filters are relatively complicated and have fragile internal parts that must be carefully fitted. Mechanical limitations usually prevent cross flow filters from being backflushed to dislodge foreign particles. They are inherently susceptible to partial plugging, which in turn results in maldistributed liquid flow and inefficient utilization of the adsorbent. Further, only a fraction of the volume in a cross flow filter cartridge is actually occupied by adsorbent material.

Thus, a system is needed that allows a column of absorbent clay particles to be brought into contact with an industrial scale aqueous effluent stream in a manner that exposes a relatively large volume of clay to the stream, yet protects the clay particle column from plugging by suspended solids that may be present in the effluent. Desirably, such a system includes means for minimizing the amount of suspended solids which travel to the particulate bed as well as means for immobilizing the suspended solid and redistributing the flow of liquid when suspended solids enter the particulate bed. It would also be desirable to have an indicator that signals when backflushing of suspended solids should be performed.

Preferably, such a system provides the above-mentioned advantages while allowing relatively easy inspection and replacement of the adsorbent material.

The present invention satisfies the foregoing desires by providing an effluent treatment system that includes a cartridge that resists partial plugging and maldistribution and which can be backflushed.

SUMMARY OF THE INVENTION

The present invention provides equipment, a system, and a process for removing dissolved heavy metal ions and other contaminants from an aqueous effluent stream which may also contain a suspended solid. Absorbent clay particles are confined within replaceable cartridges rather than scattered on the surface of tanks or reservoirs, thus operating conditions can be controlled more precisely. The clay particles are easily recoverable for disposal or regeneration, as desired.

In one aspect, the system embodying this invention includes an axial flow cartridge filled with particulate clay. This cartridge has no central void volume as distinguished from radial flow devices. Consequently, the present axial flow cartridge is relatively easier to load, to use, to empty, and to regenerate.

The axial flow cartridge of the present invention is relatively resistant to fouling by solid particles, both those which may enter as suspended solids with the effluent stream to be treated as well as those which may be produced within the cartridge due to attrition of the filtering medium. The present cartridge also withstands internal operating pressure without additional support. Accordingly, a separate housing to contain the cartridge is not required. Thus, the cartridge is relatively easy to install and to replace.

In a preferred embodiment, the contemplated axial flow cartridge has an open-ended cylindrical casing with an apertured end piece at each end of the cylindrical casing and integrally attached thereto. Taken together, the two end pieces and the casing define a filtering chamber. Within the filtering chamber is a filtering medium-a particulate bed confined between porous liquid-permeable retainer means.

A preferred system embodiment of the invention, well suited for treating aqueous effluent, utilizes the aforementioned axial flow filter cartridge in conjunction with confined flow passageways and cartridge caps that provide for ready exchange and replacement of spent cartridges. In particular, a seat for one end of the filter cartridge is provided by an upstream cartridge cap which also forms an effluent inlet port in liquid flow communication with an effluent conduit. The upstream cartridge cap and the filter, together, also define a plenum chamber for the effluent to be treated. A downstream cartridge cap defines a seat for the other end of the filter cartridge and forms a filtrate outlet port in flow communication with a filtrate conduit. A flow control valve is positioned in said effluent conduit and a back pressure regulating valve is mounted in the filtrate conduit. The filter cartridge is removably received between axially spaced cartridge caps that form a liquid-tight seal with the filter cartridge.

The present invention, in yet another embodiment, contemplates a support assembly for an axial flow filter cartridge such as described above. The support assembly incorporates a mounting post which is substantially vertically disposed and a support member attached to a sleeve that is free to slide up or down on the post. Means are provided for securing the sleeve in a predetermined position on the post. The support member extends generally horizontally from the sleeve and has a downstream cartridge cap mounted on it.

An apparatus embodiment of the present invention includes a support assembly as described above together with a filtering assembly. The filtering assembly is carried by the downstream cartridge cap and is provided with a main inlet conduit through which the aqueous effluent stream may flow, and with a branch inlet conduit capable of receiving the aqueous stream from the main inlet conduit and passing it on through an outlet end to an upstream cartridge cap. The upstream cartridge cap is in flow communication with the outlet end of the branch inlet conduit. The downstream cartridge cap and the filter outlet port are in flow communication with an outlet branch conduit, which in turn is in flow communication with a flexible conduit.

The present invention also encompasses a process for purifying an aqueous effluent stream which process involves the step of removing a suspended solid from the aqueous effluent stream by means of a hydrocyclone prior to passage through the filter cartridge. Thereafter, the process stream is contacted in laminar axial flow fashion with an elongated first particulate bed containing calcined attapulgite clay particles. Removal of debris and reduction of the amount of the suspended solids in the stream is accomplished as the stream passes through a foraminous liquid-permeable intermediate retainer prior to contact with the clay particles. Further debris removal is accomplished by passing the stream through additional downstream retainer means.

BRIEF DESCRIPTION OF THE DRAWINGS

In the accompanying drawings that form part of the specification and in which like numerals are employed to designate like parts throughout.

DESCRIPTION OF THE PREFERRED EMBODIMENTS

The present invention is effective for removing dissolved contaminants, such as heavy metal ions, hormones, toxins, viral microorganisms, and pesticides. In its various aspects, this invention includes a cartridge, a treatment system, a support assembly therefor, a filtering apparatus, as well as a process for removing dissolved contaminants from an aqueous effluent stream, particularly in the presence of a suspended solid. The features of this invention are useful, for example, to recover heavy metal cations such as chromium ions and zinc ions from an aqueous effluent waste stream of an industrial electroplating operation, to treat effluent from food processing plants, and in similar applications.

Contaminants are removed from an aqueous stream at least in part by adsorption upon and/or absorption in clay particles present as a bed contained within a filter cartridge, with or without other constituents present in the bed. Clays which are suitable for this service fall generally in the category of bentonite-type clays. More particularly, clays which are useful for the present purposes are those which have an apparent density (weight per volume, including pores) of less than about 1 gram per cubic centimeter and an apparent bulk density in the range of about 25 to about 40 pounds per cubic foot. The most common bulk density for such clays is in the 30 to 35 pounds per cubic foot range. Such clays have the ability to absorb, before calcining, nearly 25% of their weight and remain free flowing and appear dry or at the most damp. Their absorption capacity is about 80% to about 120% of the weight of the clay, based on completely saturated granular clay.

Among the absorbent clays, hormite clays are particularly suited for use in the present invention. The hormites are characterized by a porous arrangement of crystals forming microscopic size tubes within the clay. The hormites include attapulgite clay, palygorskite clay, and disordered hormite clays generally. The attapulgite clays which occur naturally in Northwest Florida and Southwest Georgia are especially preferred.

The term "attapulgite clay" as used in the clay manufacturing industry refers to a mixture of minerals having a significant amount of the mineral attapulgite and the mineral smectite, as well as measurable amounts of various other minerals. The mineral attapulgite is a hydrous silicate material represented by the approximate formula:

$(OH_2)_4(OH)_2Mg_5Si_8O_{20}\cdot 4H_2O$

See, e.g., Grim, R. E., Clay Mineralogy, 2nd ed., McGraw-Hill, Inc., New York, N.Y. (1968), p. 115.

Smectite is a generic term that refers to a variety of related minerals also found in some clays. The smectite minerals typically occur only in extremely small particles. Generally, smectite is believed to be composed of units made of two silica tetrahedral sheets with a central alumina octahedral sheet. Each of the tetrahedra have a tip that points to the center of the smectite unit. The tetrahedral and octahedral sheets are combined so that the tips of the tetrahedrons of each silica sheet and one of the hydroxyl layers of the octahedral sheet form a common layer. See Id., pp. 77–78.

In particular, the smectite family of clays includes the various mineral species montmorillonite, nontronite, hectorite and saponite, all of which can be present in attapulgite clay in varying amounts.

Other minerals, neither of the smectite genus nor of the attapulgite variety, that can be present include apatite, calcite, the feldspars, kaolinite, mica, quartz and sepiolite.

The clay preferably is superdried before it is used in the present invention. It is a characteristic of most absorbent clays, with the possible exception of sepiolite, to slake into fragments when dry clay is immersed in water. It has been found that if the clay is heated in a dry atmosphere to its de-hydroxylization temperature of about 1100° F., it will become stable and will not subsequently slake in water. Superdried clays also become harder and more resistant to abrasion. Therefore, it is necessary after mining, shredding, and drying the clay to subject the clay to a superdrying step. This is usually followed by the further clay processing steps of crushing and screening.

Clays which have been subjected to the superdrying step are referred to as low volatile matter clays (LVM). Low volatile matter clays are distinguishable from regular volatile matter clays in that the latter have been semi-calcined, usually at about 500° F. In the drying step, the clay is dried from an original moisture content in the range of about 40 to about 50% by weight down to a range of about 6 to about 10%. Upon superdrying, the moisture drops almost to zero.

The term "calcined" is sometimes used interchangeably with "superdrying," but the terms should be distinguished. Calcining usually means heating to cause substantial chemical and physical crystallographic changes in the heated subject. The clays for the present invention are not truly calcined. The superdried product is harder because nearly all of the free water has been driven off. The particles collapse, or become very intimately matted. A minor oxidation of iron atoms that are present may occur. The object of superdrying is to drive off water and other volatile components without causing substantial chemical or crystallographic changes in the clay.

Figure 1:
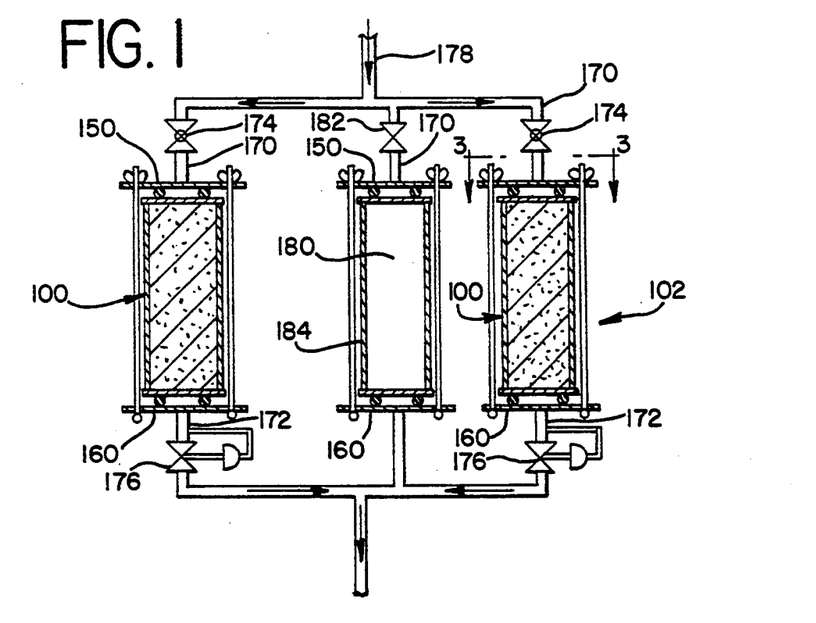
FIG. 1 is a schematic diagram, partly in section, showing a system having two cartridges and a bypass conduit in parallel with associated control valves and piping.

FIG. 1 shows a system 102 useful for removing contaminants from an aqueous wastewater stream. A common inlet manifold 178 receives an aqueous wastewater stream to be treated and carries this stream to axial flow cartridges 100 where it is contacted with absorbent clay. Common manifold 178 may be optionally provided with a pressure gauge if desired. The cartridges 100 are self-contained and self-supporting, each removably clamped between pairs of cartridge caps 150 and 160. Flow control valves 174 and back pressure valves 176 are provided so that the flow of the aqueous effluent stream can be balanced between the cartridges which are piped in parallel. A bypass conduit 180 is provided for times when one or more of the cartridges are temporarily out of service.

Specifically, a system 102 with a common inlet manifold 178 is adapted to receive aqueous effluent to be treated, e.g., from an electroplating operation. It is constructed of ferrous piping and fittings and rated to withstand in excess of 100 psig internal operating pressure. The common inlet 178 manifold branches to form plural separate effluent conduits 170, each dedicated solely to one of the cartridges 100, and to form an additional effluent conduit 170 dedicated to the bypass conduit 180.

A flow control valve 174 is installed on each of the effluent conduits 170 which lead to the cartridges 100 so that the flow of aqueous effluent through each cartridge may be individually controlled. The effluent conduit which leads to the bypass conduit 180, on the other hand, is provided with a shut-off valve 182. The valves 174 and 182 may be manually or remotely operated, as desired.

Each of the effluent conduits 170 terminates at an upstream cartridge cap 150. As shown in FIG. 1, all but one of the upstream caps function in tandem with a corresponding downstream cartridge cap 160 to hold a clay-filled, axial-flow filter cartridge between the caps in a liquid-tight seal.

Figure 2:
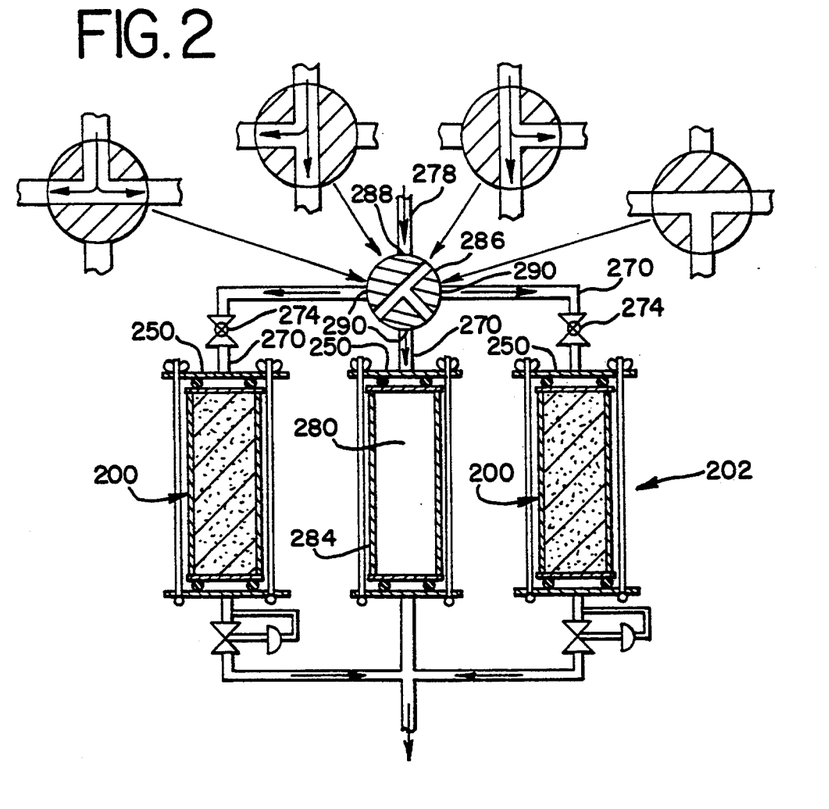
FIG. 2 is a schematic diagram of a system generally similar to that of FIG. 1 but also containing an enlarged view of a three-way valve for flow direction purposes.

FIG. 2 shows a system similar to that in FIG. 1, but additionally including a three-way valve 286 which directs the flow of the aqueous effluent stream from an inlet connection to any two of its three outlet connections. That is, the three-way valve 286 directs the stream to two axial flow filter cartridges 200, to a single axial flow filter cartridge 200 and a bypass conduit 280, or stops the flow altogether.

Figure 3:
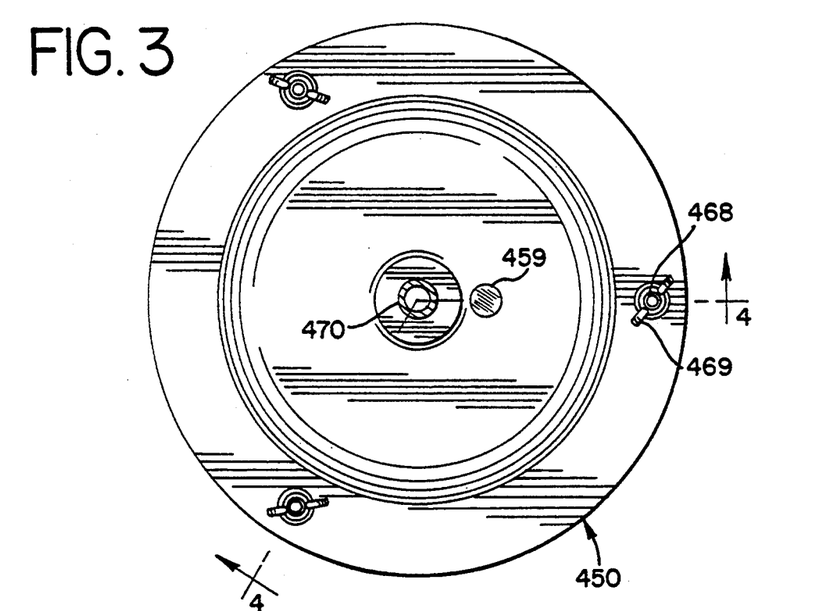
FIG. 3 is a plan view, partly in section, showing the top of an upstream cartridge cap secured by three wing nuts and provided with a sight glass.
Figure 4:
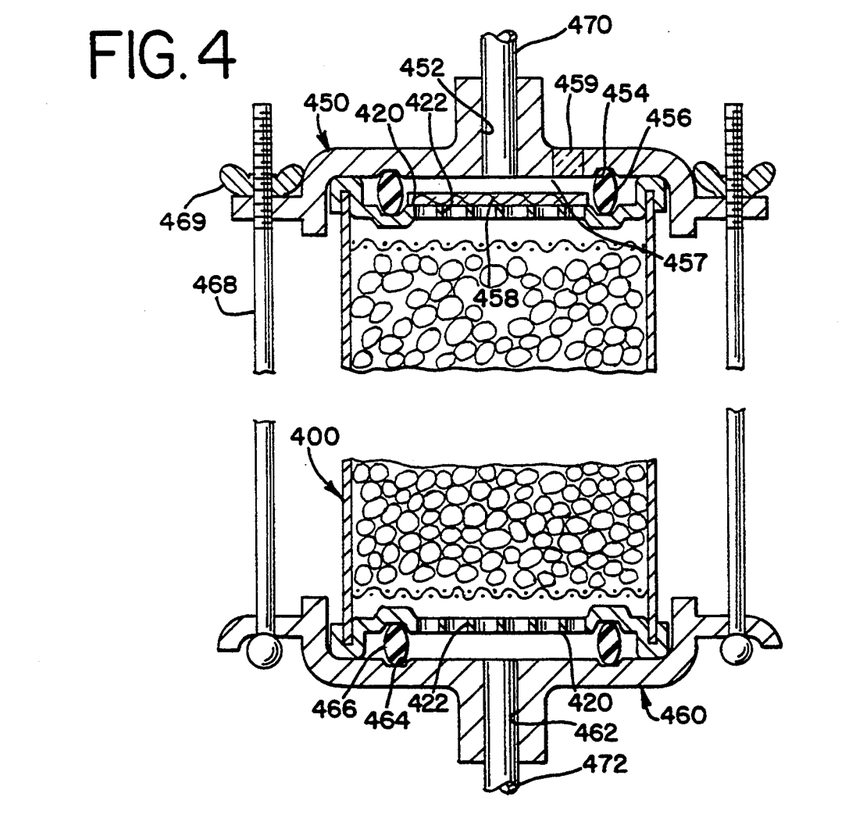
FIG. 4 is a partial cross-sectional view taken generally along the plane 4—4 in FIG. 3 and showing two opposing cartridge caps, a filter cartridge therebetween, and associated clamping means.

FIGS. 3 and 4 illustrate details of typical cartridge 400 and the associated cartridge caps 450 and 460 as they appear when installed in a system such as that shown in FIG. 1. An effluent conduit 470 is in fluid communication with an inlet port 452 formed by the upstream cartridge cap 450. The upstream cartridge cap also forms a seat 454 which functions to position and seal against a compressible gasket 456.

The particular shape and location of the gasket 456 are not critical to the success of the system and may be varied according to principles understood by those skilled in the art. However, the gasket 456 and seat 454 orientation selected is and always must be capable of maintaining a liquid seal against every internal operating pressure and temperature anticipated. This is important because the cartridge 400 of the present system is free-standing and operates without any external support or housing. Absence of an external housing makes the cartridges of the present system readily accessible, easy to install, and easy to replace when spent.

It is also important that the gasket 456 and the seat 454 are positioned to maintain a space between a portion of the upstream cartridge cap 450 which surrounds the inlet port 452 and a portion of an end piece 420 which contains apertures 422. Together, the upstream cartridge cap, the gasket, and the central portion of the end plate which defines plural apertures 422 define a plenum chamber 457. The plenum chamber puts all of the apertures located on one end of the cartridge 400 in direct flow communication with the inlet port 452.

The plenum chamber 457 redistributes the flow of the aqueous effluent stream, making it more uniformly axial before it enters the axial flow filter cartridge 400. In this regard, it is useful to position the inlet port 452 as close to the center of the end plate 420 as possible. The apertures 422 create a hydraulic resistance which works with the plenum chamber to turn the flow leaving the inlet port and so produces a more uniform axial velocity profile. True axial flow utilizes the clay adsorbent contained in cartridge 400 most efficiently. It also promotes a uniform laydown of any fouling or plugging particles which may enter the cartridge and so minimizes flow maldistribution.

An internal guard filter 458 is positioned on top of the end plate 420 and extends across all of the apertures 422 on the inlet end of the cartridge. The internal guard filter 458 is composed of a mat of fibrous materials. Alternatively, the internal guard filter may be a woven wire mesh or a filter paper disc.

It is preferred that the internal guard filter 458 is constructed from a material which contrasts in color with any suspended solid known to be present in the aqueous effluent stream. The contrast in color will enable operators to determine when the internal guard filter is spent and should be replaced. To facilitate inspection of the internal guard filter, a sight glass 459 (FIGS. 3 and 4) is installed in the upstream cartridge cap 450. The sight glass may be made of any transparent material which is chemically inert with respect to the aqueous effluent stream and which is capable of withstanding the internal operating temperature and pressure.

At the other or downstream end of the cartridge 400, the downstream cartridge cap 460 is removably positioned. The downstream cartridge cap forms an outlet port 462 which is in flow communication with a filtrate conduit 472. The cap also forms a seat 464 for a gasket 466. The seat and gasket make a liquid-tight seal between the downstream cartridge cap and the lower end plate 420.

The upper and lower cartridge caps 450 and 460 are forced against their respective gaskets 456 and 466 by the action of a wing nut 469 located on a clamping rod 468. The rod passes through a hole in an extension of each cartridge cap. Alternatively, the rod may pass through a hole in a lug attached to each cartridge cap. Three wing nut and clamping rod assemblies are equally spaced around the perimeter of each cartridge cap.

It is preferred that the external dimensions of the cartridge be identical so that the cartridge may be installed with either end oriented in the direction of flow. Accordingly, the cartridge 400 is substantially symmetrical about a plane normal to the axis of the cartridge. Axial flow may be introduced into the cartridge 400 from either direction with good results. Thus, an operator is not likely to install the cartridge in an incorrect orientation. Also, the orientation of the cartridges 400 may be reversed periodically as a means of backflushing the cartridges and removing foreign materials that sometimes become lodged within the cartridges.

Figure 5:
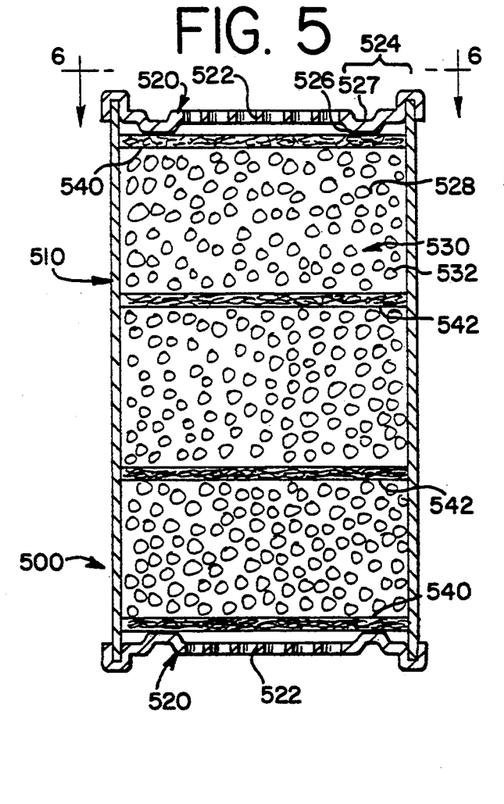
FIG. 5 is a cross-sectional side view showing the details of a cartridge having particle retainer means at each end of the cartridge and intermediate particle retainer means which include fibrous mats.

An alternative cartridge 500 suitable for purifying an aqueous effluent stream is shown in FIG. 5. The cartridge 500 comprises a casing 510, two apertured end pieces 520, a filtering chamber 528, a particulate bed 530, and retainer means 540. The casing 510 is cylindrical and open ended. The sides of the casing are solid and continuous, so as to provide a conduit suitable for confining liquid flow.

Figure 6:
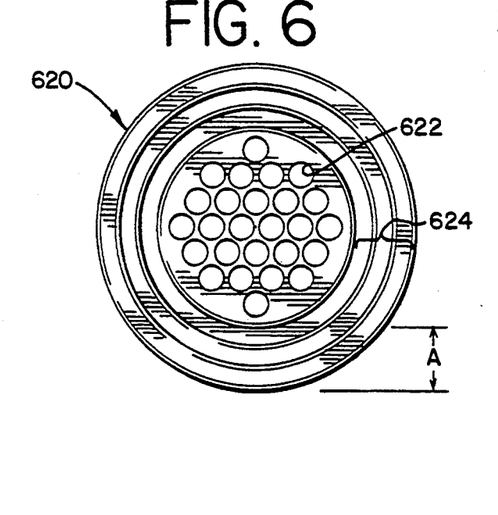
FIG. 6 is a top view of the cartridge in FIG. 5 showing multiple flow distributing apertures at the inlet end and a peripheral band circumscribing the apertures.

Apertured end pieces 520 are integrally attached at each end of the casing 510. These end pieces are generally dished and circular in shape, as best shown in FIG. 6 for end piece 620. The end piece may be welded, crimped, or otherwise permanently joined to the casing 510. Each end piece contains a plurality of apertures 522.

The end piece 520 serves to define the filtering chamber 528 and to physically contain the particulate bed 530. It contains multiple apertures which extend completely through the end plate and which are suitable for passing and distributing liquid flow. The diameter of each of the apertures is significantly less than the diameter of the retaining means 540, so that the end plate may support the retaining means against hydraulic pressure generated by a liquid flow. On the other hand, the total open area defined by the apertures in one end piece is at least about 50%, and preferably about 80%, of the transverse cross-sectional area of the casing 510. The apertures are substantially uniformly spaced throughout the cross section of the casing. Within these parameters, the apertures are sized to produce sufficient resistance to liquid flow so as to radially distribute the flow across the transverse cross section of the casing. Specific liquid flow rates can be ascertained in any given instance using calculation methods well known in the art.

The casing 510 is sufficiently strong to withstand the internal pressure necessary for treating a stream of an aqueous effluent inasmuch as a cartridge housing or any such external support member is required for the cartridge is not contemplated by this invention. The casing 510 also is able to withstand axial compressive forces generated by internal flow. In most applications, the length of the cylindrical casing exceeds its diameter. The internal surface of the casing is substantially smooth. The length-to-distance ratio of the casing in any particular instance is also determined, in part, by the pressure drop across the filter cartridge that can be tolerated for the particular process stream.

FIG. 6 depicts an overhead view of the cartridge shown in FIG. 5. In FIG. 6, an end plate 620 has apertures 622 uniformly positioned throughout its central portion and has a solid and continuous annular peripheral band 624 around its circumference. The peripheral band 624 is solid in the sense that no apertures are located within the peripheral band. The width of the peripheral band is shown as dimension A in FIG. 6. This width, preferably, is approximately one tenth the diameter of the end plate.

The central portion of the end plate 520 (FIG. 5) is generally flat. It may be grooved or crimped about the periphery thereof to facilitate attachment with the casing 510. In addition, the end plate 520 may optionally contain a debossment 526. The debossment can be used to position the cartridge when it is installed as part of a larger flow system or when plural cartridges are stacked seriatim between the same pair of opposed caps. In particular, the debossment 526 may contain a gasket seat 527 which can be used to effect a liquid seal between the end plate 520 and a mating surface. In either case, it is important that the debossment 526 be located entirely within the peripheral band 624 as the presence of an aperture within the gasket seat would defeat its primary purpose.

The apertured end pieces 520 together with the casing 510 define the filtering chamber 528 in which the particulate bed 530 and the retainer means 540 are located. The particulate bed includes a significant proportion of clay particles 532, preferably attapulgite clay, as described above. Good results are obtained when the particulate bed has a particle size such that all of the clay particles will pass through a 30 mesh screen, U. S. Sieve Series, but at least about 90% of the particles are retained on a 60 mesh screen. In superdried and screened condition, the attapulgite clay particles resist swelling and exhibit a stable, relatively predictable operating pressure profile.

Foraminous, liquid permeable retainer means prevent the clay particles 532 (FIG. 5) that constitute the particulate bed 530 from migrating out of the filtering chamber 528. In most cases, the apertures 522 in the end plate 520 are larger than an appreciable fraction of the particles which make up the particulate bed. In those circumstances, the apertures alone may not be sufficient to retain the particulate bed. While it is possible to selectively load the particulate bed so that the largest particles are positioned closest to the end plates 520, this technique is cumbersome and unreliable in practice. Preferably, a foraminous retainer means which allows a liquid flow to permeate through the retainer means yet has pores that are sufficiently small to impede the movement of the clay particles toward the end plate is provided.

Figure 7:
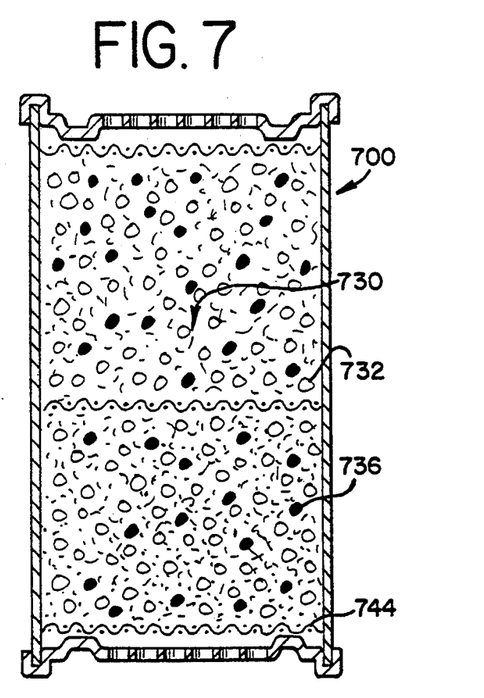
FIG. 7 is a cross-sectional side view of a cartridge having retainer means at each end and intermediate retainer means which include a woven mesh screen, and showing a particulate bed constituted by clay particles and by activated charcoal granules.

To this end, it has been found that a woven wire screen having a sieve designation in the range of about No. 40 to about No. 140, U. S. Sieve Series, is sufficiently fine to retain the clay particles and most clay debris which may be produced by attrition of the clay particles. At the same time, it does not objectionably impede the flow of the aqueous effluent stream. Ideally, the woven wire screen used as retainer means has a sieve designation of about No. 60 U. S. Sieve Series. The retaining means utilizing a screen is best illustrated in FIG. 7, below, as element 744. The U.S. Sieve Series sieve designations employed here are defined in Table 21-6 of Perry's Chemical Engineering Handbook, Sixth Edition.

Alternatively, the retainer means 540 may include a fibrous mat which is sufficiently porous to allow liquid aqueous effluent to pass, yet small enough to retain suspended solids and attrition product debris. The fibrous mat may be a fiberglass mat, or the mat may be constituted by synthetic fibers.

Retaining means 540 perform a useful function when installed at both ends of the cartridge 500. Just as it is important to prevent the clay particles 532 and debris from migrating out of the cartridge 500 and possibly damaging associated equipment, it is important to prevent suspended solids which may be present in the aqueous effluent stream from entering the cartridge 500. Such suspended solids can undesirably increase pressure drop, foster flow maldistribution, and form blockages within the cartridge.

Fortunately, many of the suspended solids encountered in industrial applications are on the same order of magnitude as the clay particle attrition products which retainer means 540 is capable of intercepting. Installing retainer means 540 at both ends of the cartridge 500 improves the reliability of the present invention. Additionally, the cartridge 500 can be arranged so that both axial ends of the cartridge have the same external dimensions. The present cartridge can be installed and utilized with axial flow through the cartridge beginning at either end.

In some cases, an aqueous effluent stream contains suspended solids that are sufficiently small so that an appreciable fraction of the suspended solids passes through retainer means 540, and enters the particulate bed. In addition, a small amount of debris may be produced by the mechanical attrition of the clay particles 532 within the particulate bed. Together, these small particles may plug the particulate bed or cause flow maldistribution.

To decrease the likelihood of such plugging or maldistribution, the cartridge 500 contains two intermediate retainer means 542 to trap suspended solids and debris which are moving within the particulate bed. Intermediate retainer means 542 extend across the full cross section of the casing 510, generally parallel to the retainer means 540. The two intermediate retainer means are evenly spaced from the end pieces and from one another.

The intermediate retainer means may be constructed either of woven wire screen or of fibrous material. In either case, the intermediate fibrous means should be disposed between and generally parallel to the retainer means. Of course, the retainer means and the intermediate retainer means in any given cartridge need not be constructed of the same material.

As mentioned hereinabove, the clay particles need not be the only constituents present in the particulate bed. For instance, in some embodiments, e.g., those illustrated in FIGS. 7 and 8, the particulate bed is constituted by an admixture of clay particles and absorbent granules and/or fibers. These embodiments are particularly useful when a suspended solid is present in the aqueous effluent stream to be treated. Fibers located within the particulate bed serve as localized filtering zones and literally strain the suspended solids from the aqueous effluent liquid, concentrating and retaining the suspended solids at various locations throughout the particulate bed. By retaining the suspended solids in a plethora of tiny, dispersed enclaves, the fibers prevent the suspended solids from forming larger agglomerations which can cause maldistribution of liquid flow through the bed and eventual plugging.

FIG. 7 illustrates a clay particle, charcoal granule system. Cartridge 700 contains a particulate bed 730. The particulate bed contains both clay particles 732 and charcoal particles 736 in a substantially homogeneous admixture.

Figure 8:
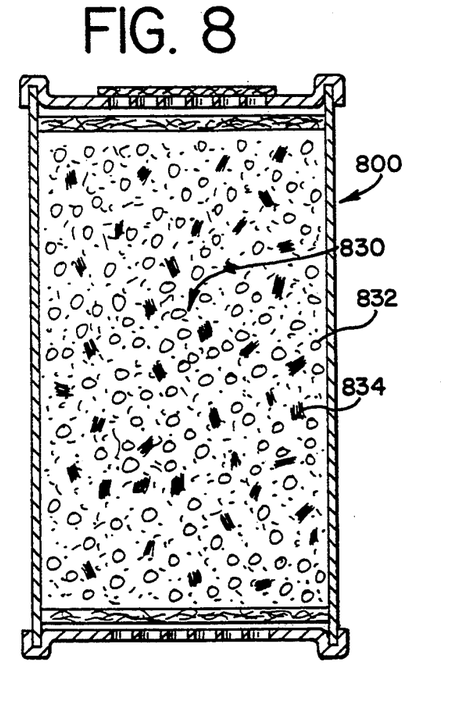
FIG. 8 is a cross-sectional view of a cartridge having a particulate bed constituted by clay particles and fibrous tufts distributed therethrough, the cartridge also having an internal guard filter.

In another illustrative embodiment of the present invention, FIG. 8, the fibers are present in the form of fibrous tufts having external dimensions on the same order of magnitude as those of the clay particles themselves. The fibrous tufts preferentially receive aqueous effluent flow because of their relatively higher porosity. As compared to the balance of the particulate bed, the tufts have a relatively low resistance to liquid flow and the aqueous stream tends to funnel through them. Enhanced local flow rates through the tufts increase the removal efficacy of suspended solids.

The fibrous tufts do not, however, disturb the flow of liquid through the particulate bed as viewed on a macroscopic scale. Because the tufts are distributed substantially uniformly throughout the particulate bed, their effect on liquid flow patterns tends to balance out across the entire length and cross section of the particulate bed. As the tufts fill with suspended solids, they do so fairly uniformly at each elevation in the particulate bed and overall flow profiles are not disturbed. For example, FIG. 8 depicts a cartridge 800 containing a particulate bed 830 which contains both clay particles 832 as well as fibrous tufts 834 distributed throughout the bed.

Other materials may be present in the particulate bed as well. For example, activated carbon granules can be distributed throughout the particulate bed in lieu of or in addition to fibrous tufts. The carbon granules remove trace amounts of oil and grease which may be present in the aqueous effluent and prevent such non-aqueous liquid components from fouling the clay particles. Additionally, the particular adsorbing properties of the charcoal granules can interact with the selective adsorbency of the clay particles to substantially fully treat a wastewater stream containing oil and other contaminants in a single processing step.

It is intended that the cartridge be utilized as a component part of a larger system for removing contaminants from an aqueous effluent stream. The system directs and controls the flow of aqueous effluent to individual cartridges, minimizes plugging, and facilitates installation and replacement of the cartridges. The clay may be flushed or regenerated in situ within the system by appropriate chemical and thermal techniques. In one aspect, the present invention provides such a system.

The present system constitutes an advance in water treatment technology because it adapts sophisticated clay adsorption techniques to the practical problems inherent in treating aqueous industrial waste effluents. Such aqueous effluent streams are not highly treated before being contacted with a clay adsorbent. The streams usually contain suspended solids and traces of oil or grease which defeat attempts to percolate the streams through standard columns of fine granular clay. The volumetric rate of such industrial aqueous streams are often substantial, but intermittent in nature. Aqueous effluent streams require a clay adsorption system which provides precise control of operating conditions in the adsorption zone, and also quick and easy installation and replacement of the clay.

The present system will be described by reference to a particular application where the contaminant is heavy metal ions in an aqueous effluent stream produced by a hypothetical industrial electroplating plant. This particular application is well known to those skilled in the art of water treatment and illustrates some of the long-standing problems which have faced the water treatment industry as a whole. Only space limitations prevent inclusion of similar descriptions for other applications. Their omission is not intended to limit the scope of the present invention in any way.

The operations of electroplating include cleaning, rinsing, and plating of a metallic substrate. To the extent that rinse water cannot be fed back to the plating cycle, the rinse constitutes aqueous effluent from the plant. Almost universally, the rinse water must be treated to reduce harmful contaminants before being discharged to the environment.

A typical aqueous effluent stream has an acidity in the range of about pH 8 to about pH 10. The stream contains heavy metal cations such as chromium and zinc ions, both in their dissolute states and in the form of salts, such as zinc hydroxide. Other frequently encountered heavy metal ions are copper, cadmium, lead, and nickel. The aqueous effluent stream further contains a suspended solid which may include metal particles, oil, grease, and shop dirt released by the cleaning operation.

For the purpose of this hypothetical application, the aqueous effluent stream has a total metal ion concentration which fluctuates in the range of about 10 to about 100 parts per million by weight of metal, a suspended solids concentration of 20 ppm by weight, and perhaps 80 parts per million of organic matter. The stream is usually available at a temperature of about 60° F. (about 15° C.).

In the system, the aqueous stream as described above is contacted with superdried absorbent clay in an elongated axial flow filter cartridge as previously described. Each cartridge is held in a liquid-tight relationship between two cartridge caps. Each cap defines a seat for one end of the cartridge and a port which normally either conducts effluent to the cartridge or conducts filtrate away from the cartridge. The ports, in turn, are in fluid communication with conduits which contain flow control and pressure-regulating valves.

Returning to FIG. 1, when system 102 is in operation, a filtrate stream having less of the contaminant than does the effluent stream exits the downstream cartridge cap 160 via the outlet port and enters a filtrate conduit 172. A back pressure valve 176 in the filtrate conduit opens to allow flow through the filtrate conduit when the pressure inside the filtrate conduit rises above a predetermined set point. The filtrate conduits 176 join to form a common outlet manifold through which the filtrate stream exits.

The remaining pair of cartridge caps are removably positioned against a cylindrical segment 184 which defines the bypass conduit 180. The bypass conduit is in intermittent flow communication with the common inlet line 178 via one of the effluent conduits 170 and the shut-off valve 182. The bypass conduit is also in flow communication with the common outlet manifold. The shut-off valve 182 is normally closed when the system is operating. The primary function of the bypass conduit 180 is to provide a means for continuing flow through the common inlet manifold 178 and the common outlet manifold when one or more of the cartridges 100 are temporarily out of service.

It is preferred that the cylindrical segment 184 which forms the bypass conduit be fashioned from parts identical with the casing and the end pieces incorporated into the cartridges 400. That is, the cylindrical segment 284 preferably has the same external dimensions as the cartridge 400, but contains neither particulate bed, nor retainer means. The cylindrical segment is essentially an empty chamber with apertured end pieces through which the aqueous effluent stream may flow substantially unimpeded.

The system 102 depicted in FIG. 1 includes two axial flow cartridges piped in parallel and removably received and retained by respective upstream and downstream cartridge caps 150 and 160. In other embodiments, the system includes four, six, or more of said cartridges in parallel.

As mentioned above, the cartridge 100 is generally in the shape of a truncated cylinder and is self-supporting under operating pressure. The system in accordance with the present invention performs well when the cartridge has a length-to-diameter ratio in the range of about 1.5 to about 5.

FIG. 2 shows a system 202 similar to the system shown in FIG. 1, but having in addition a three-way valve 286 located on a common inlet manifold 278 so as to control flow from the common inlet manifold to the cartridges 200 and to the cylindrical segment 284. The three-way valve 286 has one inlet connection 288 and three outlet connections, each of which is solely dedicated to one of the cartridges 200 or the cylindrical segment 284. The three-way valve establishes flow communication between the inlet connection 288 and any two of the three outlet connections 290, or, alternately, blocks flow communication between the inlet connection 288 and all three outlet connections 290.

Each of the outlet connections 290 is in flow communication with one of the three effluent conduits 270. Each of the two effluent conduits which lead to the cartridges 200 has a flow control valve 274 mounted on it so that flow to the cartridges may be individually controlled under normal operating conditions. The third effluent conduit 270 requires no flow control valve as the bypass conduit is operated at full flow or no flow, depending upon the position of the three-way valve 286.

Each of the effluent conduits 270 is in flow communication with an inlet port formed by an upstream cartridge cap 250. The cartridge 200 is the same as the cartridge 150 described above. Similarly, the upstream cartridge cap 250 is the same as the cap described as 150 in relation to FIG. 1. Likewise, the cylindrical segment 284 is the same as the cylindrical segment 184. The cylindrical segment 284 defines the bypass conduit 280 which permits flow to continue through the common inlet manifold 278 even while some or all of the cartridges 200 are temporarily out of service.

Either of the two systems 102 and 202 shown in FIG. 1 and FIG. 2 may be operated with additional solids separation equipment located upstream of the common inlet manifold. In a preferred embodiment, the solids separation equipment is a liquid cyclone, also called a hydroseparator. This solids separation equipment has a top cylindrical section and a lower conical section terminating in an apex opening. The aqueous effluent stream is injected into the cylindrical portion tangentially, thus producing centrifuging action and vortexing. The cover has a downward extending pipe to cut the vortex and remove an overflow product which is passed on to the axial flow cartridges. Coarser solids travel down the sides of the cone section and are removed in a partially dewatered form at the apex. The hydrocyclone provides longer cycle lives for the clay-filled axial flow cartridges and protects them from high concentrations of the suspended solids which are sometimes produced during upsets in the electroplating plant operation.

The present invention also provides a support assembly adapted to hold the cartridges, as described above, in a correct position for use in the system which has been previously described. The support assembly is also suitable for lifting the cartridges into position during installation and reinstallation. Additionally, the support assembly may be used to lower the cartridges for replacement, reorientation, and recycling.

Figure 9:
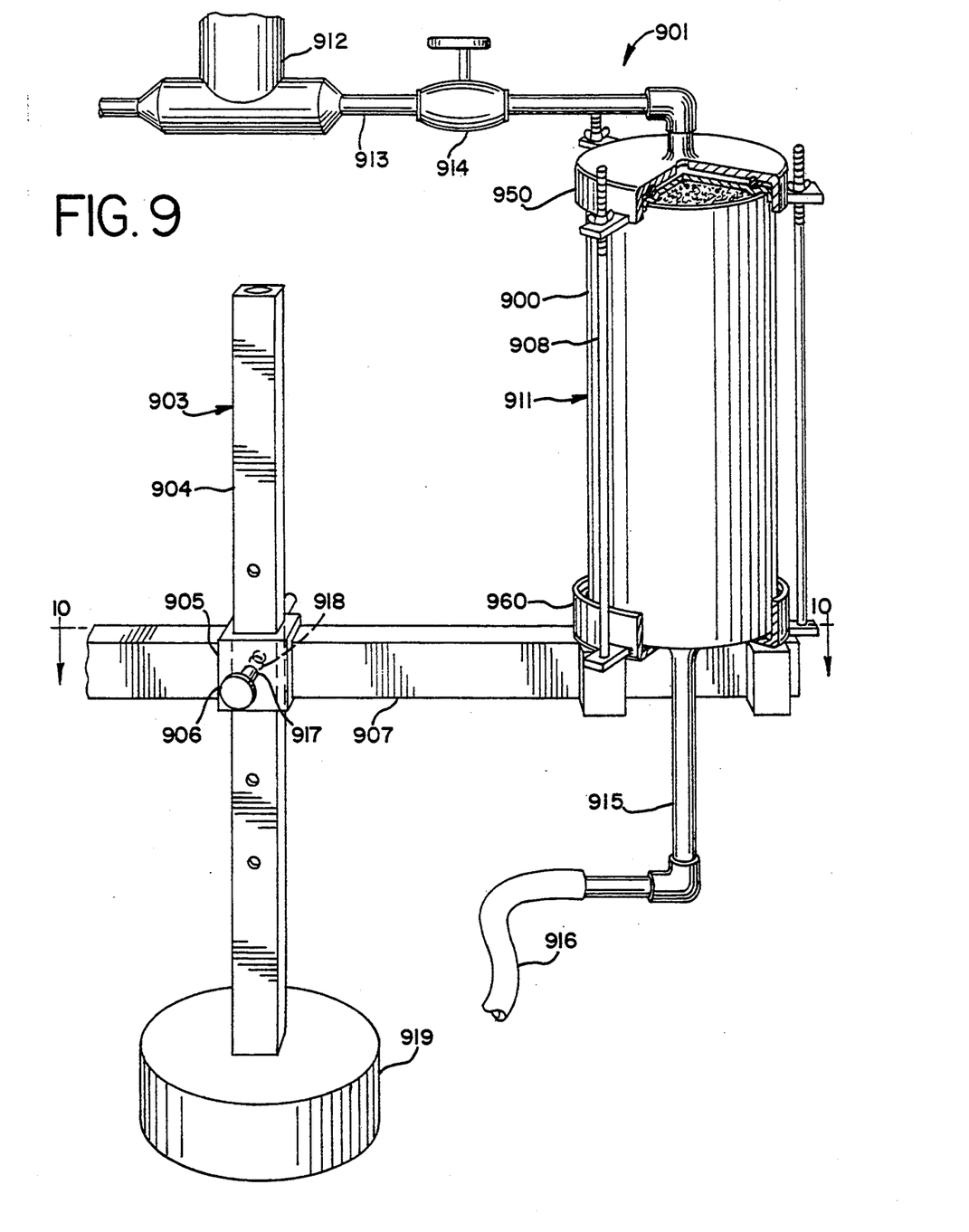
FIG. 9 is a fragmentary perspective view of an apparatus which incorporates a support assembly along with a filtration assembly.
Figure 10:
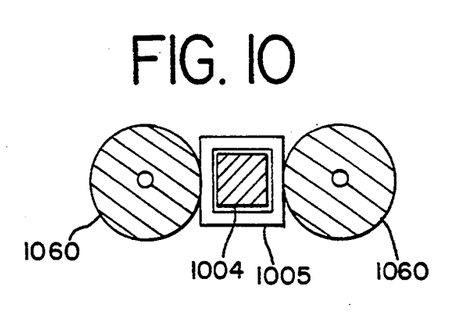
FIG. 10 is a partial, cross-sectional top view of the support assembly shown in FIG. 9 (in the interest of clarity, clamping means are not shown)
Figure 11:
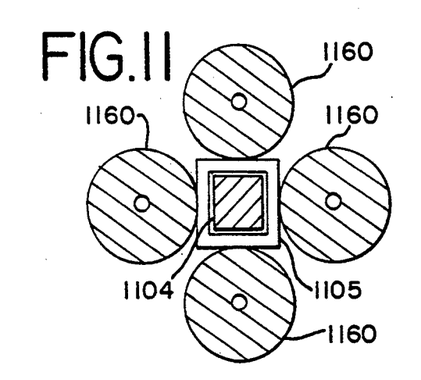
FIG. 11 is a cross-sectional top view of a support assembly similar to that in FIG. 9, but having four downstream cartridge caps (clamping means are not shown)
Figure 12:
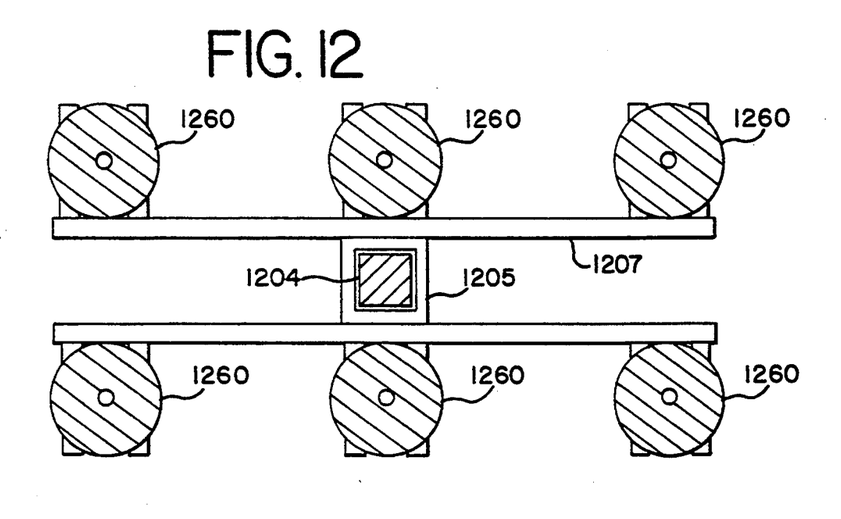
FIG. 12 is a partial, cross-sectional top view of a support assembly similar to that in FIG. 10, but having six downstream cartridge caps (clamping means are not shown).

A typical support assembly 903 is shown in FIG. 9 as it appears when holding a filtration unit 911 in a correct position for use as part of an apparatus 901 for purifying an aqueous stream. The support assembly 903 surrounds a substantially vertically disposed mounting post 904 which is sturdy, rigid, and immobile. The post 904 is embedded in a massive concrete block to enhance its stability. Alternatively, the post may be embedded in the ground or joined at either end to other structural members. The post 904 has a rectangular transverse cross section.

A sleeve 905 is slidably received and disposed about said post 904. The sleeve 905 may slide up or down in relation to the post 904. However, the sleeve 904 fits closely about the rectangular post 904 so as to limit rotation of the sleeve with respect to the post in both the vertical and the horizontal planes.

The support assembly 903 also incorporates a securement means for holding the sleeve 905 in a predetermined position on the post 904. The securement means includes a pin 906 which passes through a first hole 917 in the post and through a second hole 918 defined by the sleeve. The means for securing the sleeve may also include a jack for lifting the sleeve to the predetermined position and holding the sleeve at that position.

A support member 907 is attached to and extends generally horizontally from the sleeve 905. Mounted upon the support member 907 is a downstream cartridge cap 960 similar to the downstream cartridge cap 160 described above as part of the system for treating an aqueous effluent. The downstream cartridge cap 960 defines an outlet port and a seat adapted for a filtrate outlet end of the cartridge 900.

The downstream cartridge cap 960 is adapted to be removably attached to the cartridge 900 by clamping means 908. A gasket, not shown in FIG. 9, is fitted between the seat and the outlet end of the cartridge to create a liquid-tight seal. The support assembly 903 includes a pair of the downstream cartridge caps 960. Alternatively, the support assembly may include four, six, or more of the downstream cartridge caps.

In yet another aspect, the present invention provides an apparatus for purifying an aqueous stream. The apparatus incorporates the support assembly 903 as described above, including the post 904, the sleeve 905, the support member 907, and the downstream cartridge cap 960 defining the filtrate outlet port and the lower seat. In addition, the apparatus incorporates a filtering unit 911 carried by the downstream cartridge cap, including a main inlet conduit 912, a branch inlet conduit 913, an upstream cartridge cap 950, a cartridge 911, an outlet branch conduit 915, and a flexible conduit 916. FIG. 9 shows how the support assembly 903 and the filtration unit 911 are integrated to constitute the apparatus 901 of the present invention.

The main inlet conduit 912 receives the aqueous effluent stream from, for example, an electroplating operation. The main inlet conduit 912 is in flow communication with a branch inlet conduit 913 which has an inlet end and an outlet end. A globe valve 914 is mounted upon the branch inlet conduit 913 and can be used to stop flow through that branch inlet conduit or to balance the flow of aqueous effluent between parallel branch inlet conduits.

The outlet end of the branch inlet conduit 913 is in flow communication with an inlet port defined by the upstream cartridge cap 950. The upstream cartridge cap also defines an upper seat which removably but nestingly receives the cartridge 900.

The axial flow filter cartridge 900 is seated between the cartridge caps 950 and 960 making a liquid-tight seal with each. The outlet branch conduit 915 is in flow communication with the downstream cartridge cap 960 in the filtrate outlet port defined therein. The flexible conduit 916 is in flow communication with the branch conduit.

In order to illustrate how the support assembly 903 and the filtration unit 911 work together in the apparatus 901, their use in a typical filtration procedure will now be described. The steps necessary to remove a filter cartridge for inspection follow. For this purpose, main inlet conduit 912 currently serving four of the filtration units 911, two of which are supported by a single support assembly 903, will be described.

First, while the flow of effluent continues uninterrupted to the other filtration units 911, flow to two of the filtration units is stopped by closing the valves 914 on their dedicated branch inlet conduits 913. Additional valves located downstream of the two flexible conduits 916 are also closed. The two filtration units 911 are now isolated from the rest of the system and from each other.

Secondly, the clamping means 908 for the two cartridges of interest are loosened. The clamping means 908 in this case consists of threaded rods which pass through openings in dogs attached to the cartridge caps 950 and 960. The threaded rods are held in place by wing nuts. Loosening the wing nuts releases a pressure which the cartridge 900 and the cartridge caps 950 and 960 exert on a compressible gasket and so releases the liquid-tight seal between the cartridge and the cartridge caps.

Thirdly, the pin 906 for securing the sleeve 905 on the post 904 is disengaged so that the support member 907 and the downstream cartridge cap 960 mounted upon it can be lowered. To make disengaging the pin 902 easier, a jack (not shown in FIG. 9) may be used to slightly raise the support member 907 to a point where there is no structural load on the pin 906. The pin 906 is then removed from the hole 917 and the jack is manipulated to lower the support members 907 and the downstream cartridge caps 960 to a temporary position approximately eight inches below their normal position. As this is being done, the wing nuts of the clamping means 908 are further loosened and finally removed. The rods of the clamping means 908 are moved down and out of the way by sliding them through the holes in their respective dogs.

With the clamping means 908 clear and the downstream cartridge caps 960 lowered, the cartridges 900 are completely accessible and may be removed from their seats for inspection. The apparatus is reassembled and brought back on line by performing the same steps in reverse order.

The present invention also provides a process for purifying an aqueous effluent stream by passing such stream as an axial flow through a particulate clay bed confined within a filter cartridge. The process may also include a step of removing a suspended solid from the aqueous stream by means of a hydrocyclone prior to purification of the stream by contact with the particulate clay particles. The hydrocyclone produces a bottom stream relatively rich in the suspended solid and an overhead stream. The overhead stream is then treated to reduce the amount of dissolved heavy metal ion which it contains by contacting this stream with an elongated bed of particulate clay.

The particulate bed preferably is constituted by calcined attapulgite clay particles. The contacting is accomplished in laminar, axial flow fashion. Laminar flow produces relatively little attrition in the particulate bed and so prolongs the life of the bed. However, some attrition usually does occur, and some debris may be produced as a result.

The aqueous effluent stream next may be passed through a foraminous liquid-permeable intermediate retainer. The intermediate retainer redistributes the stream to establish a substantially uniform flow profile and also removes from the stream debris produced upstream by attrition of the clay particles in the particulate bed. Passing through the foraminous intermediate retainer also reduces the amount of the suspended solid in the stream.

The stream passing through the intermediate retainer can be additionally contacted in a similar laminar, axial flow fashion with a second particulate bed which is also elongated and constituted by calcined attapulgite clay particles and is situated downstream from the intermediate retainer. Any debris produced by fragmentation of the clay particles in the second particulate bed can be removed by passing the stream through another downstream retainer means.

Other advantages and features of the present invention will become readily apparent to those skilled in the art from the following detailed description of the invention, the claims, and the accompanying drawings.

What is claimed is:

1. A cartridge suitable for purifying an aqueous effluent which comprises:

an open-ended cylindrical casing;

a generally dished and circular end piece at each end of said cylindrical casing, integral therewith, and defining together with said casing a filtering chamber, each of said end pieces having a central portion and an annular peripheral band, said central portion having a plurality of apertures uniformly positioned thereon, and said peripheral bands having a continuous annular debossment defining a seat for a gasket;

a filtering medium particulate bed within said filtering chamber; and a foraminous, liquid permeable retainer means in said filtering chamber, in juxtaposition to each of said end pieces and between said particulate bed and said end piece so as to retain said particulate bed within said filtering chamber.

2. The cartridge in accordance with claim 1 wherein said particulate bed has a particle size such that all of said particles pass through a 30-mesh screen, U.S. Sieve Series, but at least about 90% of the particles are retained on a 60-mesh screen, U.S. Sieve Series.

3. The cartridge in accordance with claim 1 wherein the particulate bed is constituted by superdried attapulgite clay.

4. The cartridge in accordance with claim 1 wherein the particulate bed is constituted by an admixture of clay particles and fibers.

5. A cartridge in accordance with claim 1 wherein the particulate bed is constituted by a substantially uniform admixture of clay particles and fibrous tufts.

6. The cartridge in accordance with claim 1 wherein the particulate bed is constituted by a substantially uniform admixture of clay particles and activated carbon granules.

7. The cartridge in accordance with claim 1, wherein each of the retainer means is a woven-wire screen having a sieve designation in the range of about No. 40 to about No. 140, U.S. Sieve Series.

8. The cartridge in accordance with claim 1 wherein an intermediate retainer means is provided disposed between and generally parallel to said foraminous retainer means.

9. The cartridge in accordance with claim 8 wherein two intermediate retainer means evenly spaced from the end pieces and from one another are present.

10. The cartridge in accordance with claim 1 wherein said foraminous retainer means includes a fibrous mat.

11. The cartridge in accordance with claim 10 wherein the mat is fiberglass mat.

12. The cartridge in accordance with claim 10 wherein the mat is constituted by synthetic fibers.

13. The cartridge in accordance with claim 10 wherein an intermediate fibrous retainer means is disposed between and generally parallel to said foraminous retainer means and one of said end pieces.

14. The cartridge according to claim 1 wherein each of said end pieces defines a plurality of apertures having a total cross-sectional area greater than 0.5 times the cross-sectional area of the end piece.

15. The cartridge in accordance with claim 1 wherein the width of the peripheral bands is about one-tenth the diameter of said casing.

* * * * *